J. KROLL.
COMBINED MATCH CONTAINER AND LIGHTER.
APPLICATION FILED NOV. 29, 1912.
1,124,146.
Patented Jan. 5, 1915.
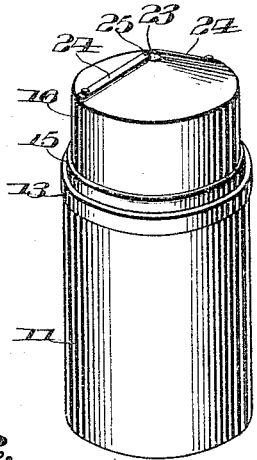
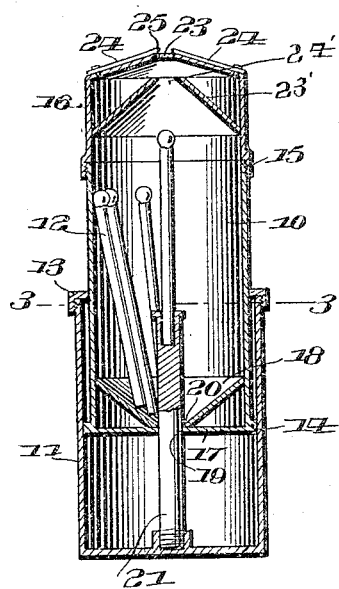
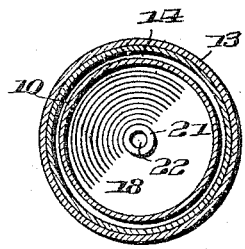
Inventor
Joseph Kroll
Witnesses
By Victor J. Evans
Attorney

UNITED STATES PATENT OFFICE.

JOSEPH KROLL, OF BROOKLYN, NEW YORK.

COMBINED MATCH CONTAINER AND LIGHTER.

1,124,146.      Specification of Letters Patent.      Patented Jan. 5, 1915.

Application filed November 29, 1912. Serial No. 734,116.

*To all whom it may concern:*

Be it known that I, JOSEPH KROLL, a citizen of the United States, residing at Brooklyn, in the county of Kings and State of New York, have invented new and useful Improvements in Combined Match Containers and Lighters, of which the following is a specification.

An object of the invention is to provide a combined match container and lighter adapted to contain matches which can be removed from the container and ignited while being removed from the container.

The invention embodies, among other features, a casing adapted to contain a number of matches and which is movable in a second casing provided with means whereby the ignitible end of a match will appear exteriorly of the first casing and be ignited while being advanced in the first casing to the exterior thereof.

In the further disclosure of the invention reference is to be had to the accompanying drawings, constituting a part of this specification, in which similar characters of reference denote corresponding parts in all the views, and in which:

Figure 1 is a perspective view of the device; Fig. 2 is a vertical longitudinal sectional view showing a match in position to be advanced to the exterior of the casing; and Fig. 3 is a horizontal sectional view taken on the line 3—3 in Fig. 2.

Referring more particularly to the views, use is made of a casing 10 slidable into and upon a casing 11, the casing 10 being adapted to contain a quantity of matches 12, as shown. The upper end of the casing 11 is threaded to receive a collar 13 which is adapted to be engaged by an annular flange 14 formed on the casing 10, thus limiting the upward sliding movement of the casing 10, the downward movement of the casing 10 into the casing 11 being limited by an annular threaded flange 15 formed with a cover 16 constituting a part of the casing 10 and having threaded connection therewith as shown, the matches being placed in a quantity in the casing 10 by first removing the cover 16 as will be readily understood.

Mounted to repose on the bottom 17 of the casing 10 is an inclined frusto-conical circular floor 18 adapted to receive and support the matches in the casing 10, an opening 19 being provided in the bottom 17 and registering with an opening 20 in the floor 18, with a vertical supporting member 21 passing through the registering openings 19 and 20 and having the lower end thereof secured to the bottom of the casing 11 in any suitable manner, the upper end of the supporting member 21 being provided with a recess 22 adapted to receive an end of a match therein to support the same in vertical position and in alinement with an opening 23 in the upper end of the cover 16. The cover 16 has disposed integrally thereof a conical member 23′ having formed in its upper end a discharge opening 24′ and said opening alining with the opening 23 in the cover 16. By the threaded connection of the cover 16 with the casing 10, permits of the adjustment of the conical member 23′ in a direction toward and away from the flooring 18, whereby the casing 10 will receive matches of different lengths and the discharge of such matches from the casing will be conveniently accomplished.

Now assuming that the casing 10 is in lowermost position on the casing 11, and filled with matches, when it is desired to remove a match from the casing 10, the casing 10 is raised upwardly to the limit of its movement on the casing 11, thus causing one of the matches supported by the frusto-conical floor 18 to slip into the recess 22 and be supported in a vertical position by the supporting member 21 so that when the casing 10 is again moved downwardly on the casing 11 a match will be advanced through the opening 23 so that the ignitible end thereof will project through the upper end of the casing 10. Igniting members 24 are mounted to swing on the upper face of the cover 16 and have roughened surfaces 25 adapted to project slightly across the opening 16 to engage the ignitible end of the match when the casing 10 is moved downwardly to advance the match through the opening 23, thus resulting in the ignition of the match at the moment it is advanced exteriorly of the casing 10.

The device described is preferably assembled by first mounting the supporting member 21 in the casing 11, then mounting the casing 10 in the casing 11, after which the collar 13 is arranged upon the casing 11 to retain the casing 10 therein. The casing 10 is now filled with matches and the cover 16 is then screwed on to the casing 10, it being seen from the views that the flange 15 for threading the cover 16 on the casing 10 will limit the downward sliding movement of the casing 10 relatively to the casing 11. If it is desired to obtain a match from the casing 10 without igniting the same, the igniting members 24 can be readily swung out of operative position and away from the opening 23 so that when a match is supported on the supporting member 21 and the casing 10 is moved downwardly the ignitible end of the match will be advanced through the opening 23 but will not, however, come in contact with the igniting members so that the match can be removed from the device described without resulting in the ignition of the same at the moment of removal.

Having thus described my invention, I claim:

A device of the character described comprising a cylindrical casing provided with a discharge opening and adapted for the reception of matches and having a threaded upper end and an apertured closed bottom wall, a protruding portion formed on said casing, a second casing slidably receiving said first casing and having a threaded upper end, a flanged collar threadedly connected with the threaded upper end of the said second casing for coöperation with the protruding portion on said first mentioned casing, a downwardly converging flooring formed integral with the bottom of said first mentioned casing having an aperture adapted to register with the former mentioned aperture, said flooring adapted to engage the sides of its casing, an adjustable detachable supporting member carried by the bottom of said second mentioned casing and adapted to protrude through the said registering apertures, a closure threadedly connected with said first mentioned casing, a conical member mounted in said closure and adapted for adjustment in a direction to and from the said flooring, whereby the said first mentioned casing may readily accommodate and discharge matches of different lengths.

In testimony whereof I affix my signature in presence of two witnesses.

JOSEPH KROLL.

Witnesses:
 RUBIN MARGULIES,
 MAE LADER.